No. 783,100. Patented February 21, 1905.

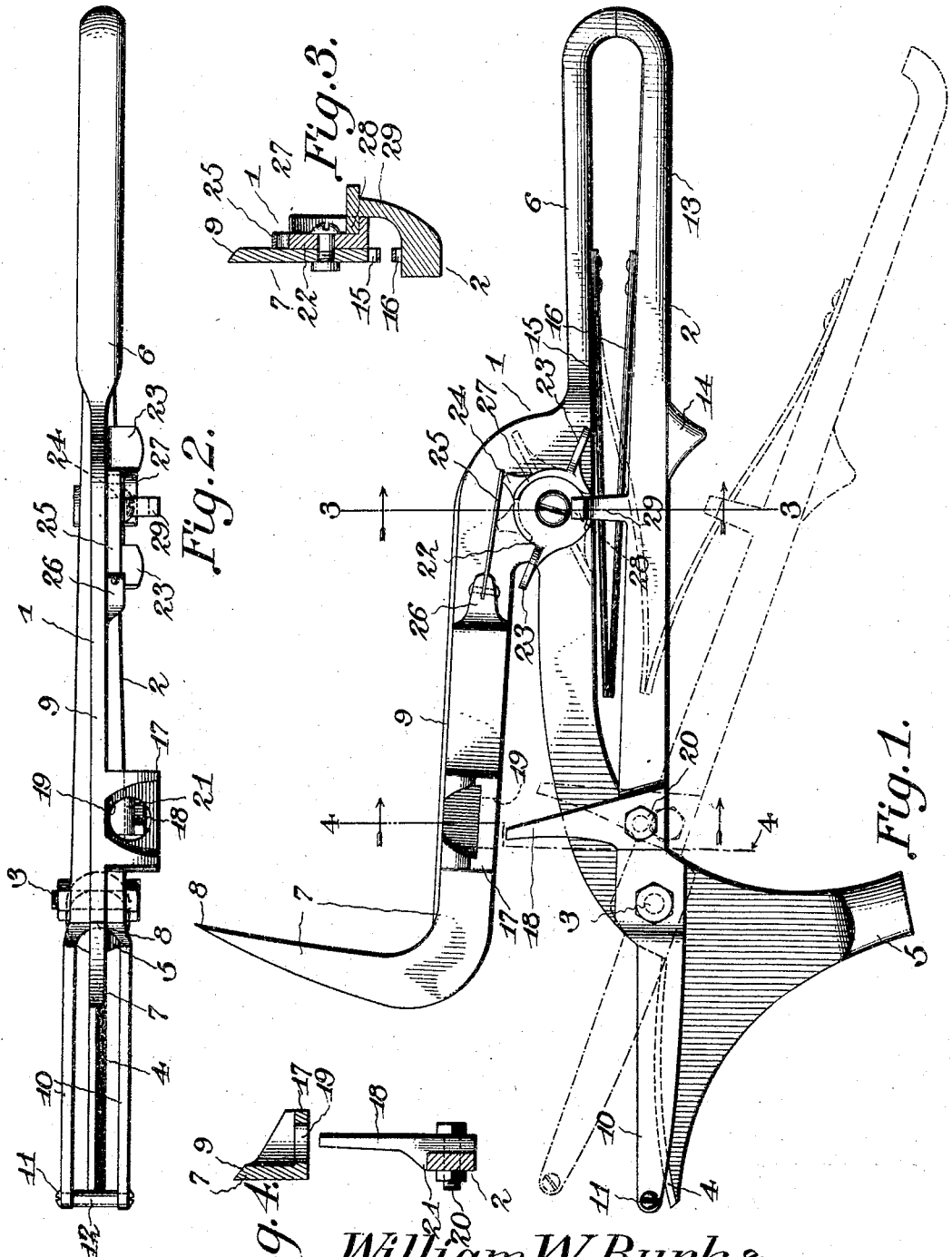

UNITED STATES PATENT OFFICE.

WILLIAM W. BURK AND EDWARD BURK, OF FOREST, OHIO.

SLATE-WORKING TOOL.

SPECIFICATION forming part of Letters Patent No. 783,100, dated February 21, 1905.

Application filed March 2, 1904. Serial No. 196,222.

*To all whom it may concern:*

Be it known that we, WILLIAM W. BURK and EDWARD BURK, citizens of the United States, residing at Forest, in the county of Hardin and State of Ohio, have invented a new and useful Slate-Working Tool, of which the following is a specification.

This invention relates to slate-working tools, and more especially to tools in which mechanism for cutting slate is combined with mechanism for punching holes therein.

The principal object of the invention is to provide a simple and comparatively cheap tool adapted for use in connection with an ordinary "slater's stake" for cutting and punching slate and also adapted for cutting and punching slate without the use in connection therewith of a slater's stake.

A further object of the invention is to provide a combined slate cutting and punching tool of light and simple structure, but so designed as to withstand the strains to which it will be subjected in practical use and to be susceptible of long and efficient service.

In attaining the objects above mentioned we preferably employ the novel construction and combination of parts of a slate-working tool hereinafter fully described and claimed and illustrated in the preferred form of embodiment in the accompanying drawings, forming a part of this specification, it being understood that various changes in the form, proportions, and exact mode of assemblage of the elements may be made without departing from the spirit of the invention or sacrificing the advantages thereof.

In the drawings, Figure 1 is a side view of the tool, showing the members thereof locked together, the position of the members when unlocked being indicated by dotted lines. Fig. 2 is a top view of the tool. Figs. 3 and 4 are sectional views on the lines 3 3 and 4 4, respectively, of Fig. 1.

Referring to the drawings, in which corresponding parts are designated by similar characters of reference throughout the several views, 1 and 2 designate the main members of the tool, and 3 designates the pivot-bolt by which the members 1 and 2 are connected. The member 1 includes a blade 4, presenting a convexly-curved edge, a nailing-head 5, disposed below the blade, a handle 6, and a supplemental arm 7, which rises from the member 1 adjacent to the handle portion, extends forward and then upward to terminate in a sharp point or spur 8, which forms a punch that may be used upon slate supported upon the usual slater's stake. The forwardly-extending portion of the arm 7 is beveled at its upper edge, as shown at 9, and the beveled edge so formed is adapted for use in cutting slate when supported upon a slater's stake. The member 2 is almost straight and comprises a bifurcated end portion presenting arms 10, which extend forward upon opposite sides of the blade 4 of the member 1 and coöperate therewith in cutting slate when the tool is used for cutting slate without the assistance of a slater's stake. The arms 10 are connected at their forward ends by means of a bolt 11 and are spaced at a fixed distance apart by a sleeve 12, encircling the bolt and disposed between the two arms. At the opposite end the member 2 presents a handle portion 13, bent to correspond to the handle portion 6 of the member 1 and contacting with the said handle portion of the member 1 when the two handle portions are drawn together, as shown in Fig. 1. Just in front of the handle portion 13 a conical projection or lug 14 is formed on the under surface of the member 2 to provide a shoulder against which the hand of the gripman may be pressed in using the implement.

The members 1 and 2 are held normally in the position indicated by the dotted lines in Fig. 1, a pair of leaf-springs 15 and 16 being disposed between the said members and attached to members 1 and 2, respectively, in order to keep the members normally separated. Consequently after each movement of the two members in cutting slate the members will separate under the influence of the springs as soon as the hand is relaxed.

The punching devices provided upon the members 1 and 2 for use in punching slate without the assistance of a slater's stake includes a laterally-projecting lug 17 upon the arm 7 of the member 1 and an upwardly-projecting member 18 removably secured upon the member 2 beneath the lug 17. The lug 17 is recessed upon its upper surface, as shown, and is provided with a circular opening 19, whose margin coöperates with the member 18 in punching holes in slate. The member 18 is preferably constructed in the form shown in the drawings, having the upper part tapering, but terminating in a flat end. The member 18 is secured in position by a bolt 20 and a shoulder 21, formed on the side of the member 18 and adapted to rest upon the upper surface of the member 2.

The operation of members 17 and 18 in punching slate will be readily understood from an inspection of the drawings. When the members are separated, as shown in dotted lines in Fig. 1, slate of any ordinary thickness may be introduced between the said members, and when the handle portions of the members 1 and 2 are drawn together by the contraction of the hand the member 18 will be pressed against the under surface of the slate with great force, the member 18 being located very near the bolt 3, which serves as the pivot upon which members 1 and 2 turn, and hence forms the fulcrum of the lever by means of which the member 18 is operated. The pressure of the member 18 upon the underside of the piece of slate is opposed by the pressure of the lug 17 upon the upper surface, and consequently a small portion of the slate corresponding to the opening 19 in the member 17 upon its upper surface and corresponding to the area of the end of the member 18 on its lower surface will be punched out, so leaving a hole with a countersunk portion adapted to receive the head of a nail.

The locking device by means of which the members 1 and 2 of the tool are secured in the position shown in solid lines in Fig. 1 in order to adapt the tool for use for nailing or for working the slate in connection with the slater's stake are clearly shown in Figs. 1 and 3. The member 1 has pivotally mounted on the side thereof a locking member 22 of substantially circular form, but having laterally-projecting thumb-lugs 23 and a third lateral projection 24, which is adapted to engage a small leaf-spring 25, secured in a lug 26 upon the arm 7 of the member 1. Upon the face of the locking member 22 a segmental rim 27 is provided. This rim 27 is preferably of the dimensions shown in Fig. 1 and is adapted for engagement with a lug 28 at the end of an upwardly and outwardly projecting curved arm 29, formed upon the member 2. When the members 1 and 2 are brought into the position shown in Fig. 1 and the locking member 22 is thrown into its solid-line position, the rim 27 and the lug 28 engage, as indicated in Fig. 3, and the spring 25 presses against the lug 24 and holds the member 22 in the position indicated as long as may be desired. When the member 22 is thrown into the position shown in dotted lines and the rim 27 no longer engages with the lug 28, the members 1 and 2 will be separated by the action of the springs 14 and 15 and the locking member 22 will be held in inoperative position, as indicated.

When the members 1 and 2 are locked together by means of the locking devices described in the foregoing paragraph, the entire tool forms a substantially unitary structure and may be used at will as a hammer, as a punch, or as a cutter in connection with an ordinary slater's stake to support the slate to be punched or cut.

From the foregoing description of the construction and operation of our improved slate-working tool it may be readily seen that we have provided in a light and compact structure means for performing the operations of cutting and punching slate with or without a slater's stake and have also provided a hammer-head which is adapted for use in nailing, so enabling the slate-worker to perform practically all of the operations which are ordinarily necessary by means of a single tool. By embodying in a single tool means for cutting and punching the slate as well as nailing it in position the workman will be saved a considerable amount of time which would otherwise be lost in laying down one tool and taking up another. He is also saved the trouble of carrying a number of the tools ordinarily included in his kit and does not find it necessary to shift several tools every time he changes his position in order to carry his work forward.

One of the special features of advantage possessed by our improved slate-working tool is the novel locking device by means of which the main members 1 and 2 of the tool may be instantly locked together when it is desired to use the tool as a hammer or in connection with an ordinary slater's stake. By means of the thumb-lugs attached to the locking member it may be readily thrown into or out of locking engagement with either hand, and by making use of the hand in which the tool is grasped the other hand may be left free to handle the slate.

While the point 8 upon the upturned end of the arm 7 is adapted for use in punching holes in slate, it is preferable to make use of the punching members 17 and 18 whenever it is desired to punch nail-holes. The formation of nail-holes by means of members 17 and 18 is more satisfactory, because the holes may be more accurately located and because they will be of the dimensions most desirable for receiving the nails. As the member 18 will become worn after long usage and its action may therefore be unsatisfactory, the said member is removably mounted upon the member 2 and may be readily replaced at small cost whenever necessary. Similarly the springs 15, 16, and 25, which are the only other portions of the tool which are liable to injury, may also be readily replaced.

Having thus described the construction and use of our invention, what we claim as new, and desire to secure by Letters Patent, is—

1. In a slate-working tool, a member comprising a blade, a hammer disposed below said blade, a supplemental arm disposed above said blade and a female punching member projecting laterally from said arm, a second member pivoted to the first-mentioned member and including a pair of parallel arms spaced to receive the blade between them and for coöperation with the latter and a male punching member carried by the said second member for coöperation with said female punching member.

2. In a slate-working tool, the combination with a member presenting a cutting-blade, a hammer-head disposed below the blade, a supplemental arm provided upon the top of said member and extending forwardly and upwardly therefrom, a laterally-projecting lug having an opening therein provided on said arm to constitute a female punching member, and an upturned punch at the forward end of said arm, of a second member pivoted to the first-mentioned member and including a pair of arms arranged on opposite sides of said blade for coöperation therewith, and a male punching member carried by the second member for coöperation with the female punch.

In testimony that we claim the foregoing as our own we have hereto affixed our signatures in the presence of two witnesses.

WILLIAM W. BURK.
EDWARD BURK.

Witnesses:
   CHAS. PRICE,
   J. F. STEINMAN.